United States Patent [19]

Barber, Jr.

[11] Patent Number: 4,933,240
[45] Date of Patent: Jun. 12, 1990

[54] WEAR-RESISTANT CARBIDE SURFACES

[76] Inventor: William R. Barber, Jr., 2924 N.E. 88th Pl., Portland, Oreg. 97220

[21] Appl. No.: 112,949

[22] Filed: Oct. 26, 1987

Related U.S. Application Data

[63] Continuation-in-part of Ser. No. 813,937, Dec. 27, 1985, abandoned.

[51] Int. Cl.$^5$ .................... B32B 15/04; C21D 9/00
[52] U.S. Cl. .................... 428/608; 428/614; 428/627; 148/127; 228/124
[58] Field of Search .............. 428/608, 614, 627; 51/307, 309, 293; 228/122, 124, 263.12, 189, 215, 216; 76/DIG. 11; 75/239, 240, 236, 247, 241; 148/11.5 Q, 13.2, 127, 143

[56] References Cited

U.S. PATENT DOCUMENTS

| | | | |
|---|---|---|---|
| 1,903,077 | 3/1933 | Wolf | 76/DIG. 11 |
| 1,910,884 | 5/1933 | Comstock | 75/240 |
| 2,276,258 | 1/1942 | Buchmann | 428/608 |
| 2,367,286 | 1/1945 | Keeleric | 76/DIG. 11 |
| 2,833,638 | 5/1958 | Owen | 51/309 |
| 3,001,057 | 9/1961 | Hackman et al. | 228/216 |
| 3,117,845 | 1/1964 | Reed | 75/240 |
| 3,223,823 | 12/1965 | Keller | 228/215 |
| 3,272,603 | 9/1966 | Larsen | 75/247 |
| 3,276,852 | 10/1966 | Lemelson | 51/307 |
| 3,293,029 | 12/1966 | Broderick | 75/247 |
| 3,751,283 | 8/1973 | Dawson | 228/122 |
| 3,807,965 | 4/1974 | Tazaki et al. | 75/240 |
| 3,823,002 | 7/1974 | Kirby et al. | 75/240 |
| 3,882,594 | 5/1975 | Jackson et al. | 29/527.5 |
| 3,972,466 | 8/1976 | Keith | 228/216 |
| 4,017,480 | 4/1977 | Baum | 75/240 |
| 4,182,951 | 1/1980 | Kuder | 228/216 |
| 4,208,563 | 6/1980 | Frantzreb et al. | 228/215 |
| 4,247,750 | 1/1981 | Hope | 228/216 |
| 4,345,130 | 8/1982 | Okutomi et al. | 428/627 |
| 4,576,825 | 3/1986 | Olsson et al. | 428/627 |

FOREIGN PATENT DOCUMENTS

| | | | |
|---|---|---|---|
| 201764 | 8/1955 | Australia | 51/307 |
| 1098131 | 3/1981 | Canada | 75/240 |
| 536518 | 5/1941 | United Kingdom | 51/309 |

OTHER PUBLICATIONS

A Dictionary of Metallurgy, A. D. Merriman, MacDonald & Evans, LTD., 1958, "Cemented Carbides", p. 32.

The Welding Engineer, "Tool Tipping Data", Data Sheet No. 34, p. 61, Jul. 1943.

Primary Examiner—John J. Zimmerman
Attorney, Agent, or Firm—Chernoff, Vilhauer, McClung & Stenzel

[57] ABSTRACT

A wear-resistant surface structure having a high resistance to impact and thermal shock, suitable for a wide variety of tools and implements, is prepared by bonding carbide particles together with a substantially pure copper matrix in the absence of oxygen. The carbide-copper surface structure can be bonded to the working surface of a ferrous tool simultaneously with the aforementioned bonding process, or at a later time. Although attachment of the surface structure to a ferrous tool normally requires heating of the tool to a softening temperature, such softening may be corrected by subsequently quenching the combined ferrous tool and carbide-copper surface structure from an austenitizing temperature without cracking the copper matrix. Refractory sheet materials are used to contain the carbide and matrix material during liquefaction of the matrix material during the formation of the surface structure.

19 Claims, 5 Drawing Sheets

WEAR-RESISTANT CARBIDE SURFACES

CROSS-REFERENCE TO OTHER APPLICATION

This application is a continuation-in-part of application Ser. No. 813,937, filed Dec. 27, 1985, now abandoned.

BACKGROUND OF THE INVENTION

The present invention relates to improvements in methods and structures for providing highly wear-resistant, carbide-containing surfaces on tools or implements used for excavating, drilling, materials processing, materials handling, and other applications requiring substantial exposure to abrasion (referred to hereafter collectively as "tools"). More particularly, the invention relates to providing such a wear-resistant surface which is able to withstand a high degree of impact loading and thermal shock without cracking of the surface structure. The resistance to thermal shock permits hardening, by quenching, of a ferrous tool to which the wear-resistant surface structure has previously been attached by brazing or welding at a temperature tending to soften the tool, thereby providing the tool with strength and hardness in a manner compatible with the wear-resistant surface. Moreover, the surface structure has wear resistance superior to that of other carbide-containing surfaces, because wear-resistance is imparted to its matrix.

In the past, the construction of wear-resistant surfaces for tools of the type subjected to a high degree of abrasion has consisted of forming pads of carbide particles bonded together by a brazing matrix, and brazing such pad to the ferrous base metal of the tool, as shown, for example, in U.S. Pat. Nos. 2,833,638 and 3,882,594. All such methods and structures require that the ferrous base metal of the tool, where the pad is attached, be heated to a softening temperature in order to accommodate the brazing procedure, thus softening the base metal even though it may have originally been hardened by heat treatment with quenching. The result is a tool or implement whose wear resistance is improved, but whose strength and hardness are reduced, often causing deformation when the tool is subjected to impact loads. Such impact loads also cause the carbide particles to be torn out of the brazing matrix bonding them together.

In the course of developing the present invention, it has been discovered that the foregoing problems of prior art wear-resistant surface structures are due largely to their use of matrix materials for binding the carbide particles together which comprise copper alloys having substantial noncopper elements such as tin, zinc, cadmium, beryllium and the like. These noncopper elements, when used in combination with copper, form low melting point constituents within grain boundary locations in the matrix that lead to cracking upon a severe thermal shock treatment, such as quenching steel from an austenitizing temperature. Such cracking in turn leads to fracture when the surface structure is subjected to high-impact loads. Accordingly, to preserve the impact-resistance of the surface structure, quenching of the tool after attachment of the wear-resistant surface must be avoided at the expense of tool hardness.

Although the use of pure copper, as a brazing and matrix material, has long been known, its possible relevance to the aforementioned problem of incompatibility between the impact-resistance of carbide-containing surfaces and the hardness of their underlying tools has not previously been recognized.

Another problem of prior carbide-containing, wear-resistant surface structures involves their method of manufacture. Unless the surface structure is formed in a cavity or pocket machined into the tool or other base metal upon which the surface structure is to be mounted, it is exceedingly difficult to contain the carbide particles and matrix material on the base metal during the time that the assembly is in a furnace and the matrix material is in a molten condition. Carbide particles, particularly in large granular form, are intrinsically heavy and will roll off the edge of a part or slide down slight inclines unless restrained against doing so. Thus, without containment provided by machining a cavity into the base metal, it is difficult to obtain uniform distribution of the larger carbide granules over the surface of the base metal and, in particular, difficult to achieve uniformity in carbide particle distribution at the edges where the particles have a tendency to roll off. Unfortunately, if machined cavities in the base metal are employed to solve these problems, substantial extra cost incident to the machining is required Furthermore, after hardening of the carbide-containing surface structure, the outer edges of the cavity tend to protrude above the surface structure because of the volume collapse of the carbide and matrix mixture, requiring subsequent expensive grinding or machining to make the end product serviceable.

Other problems of prior wear-resistant surface technology include the limited methods and structures available for attaching the carbide-containing surface to a ferrous (steel or iron) tool, particularly with respect to effectiveness and convenience when the surface is attached to the tool after, rather than during, initial formation of the surface structure.

In addition, the prior art has paid little attention to the need for creating an environment for high flowability of the matrix during formation of the surface structure, so as to minimize voids and thereby maximize the integrity of the surface structure.

SUMMARY OF THE INVENTION

The present invention overcomes the aforementioned deficiencies of the prior art by bonding carbide particles, of either the cemented or uncemented type, together in a matrix of essentially pure copper (i.e. containing no contaminants or other elements other than those normally found in electrical copper scrap material). It has been found that, by melting the essentially pure copper while in contact with the carbide particles in a substantially oxygen-free atmosphere, and then freezing the copper, a bond is formed between the copper and carbide particles which, upon subsequently being quenched from a temperature in the austenitizing range for steel or other ferrous materials (i.e. about 1600° F. to 1800° F.), is ductile enough to resist the forces created between the carbide and copper due to large differences in thermal expansion properties, thereby avoiding cracking and resultant fracture under impact loads. Thus the ferrous tool, to which the carbide-copper surface structure has been previously attached, can be hardened by quenching without diminishing the impact resistance of the surface structure. Accordingly, the needed characteristics of both the surface structure and the tool can be obtained compatibly.

Moreover, an equally impact-resistant and thermal-resistant bond can be developed between the essentially pure copper matrix and a ferrous substrate (i.e. either the tool itself, or an intermediate ferrous member which will ultimately be attached to the tool by welding) if the essentially pure copper is likewise melted in the absence of oxygen while in contact with the ferrous substrate, and then frozen.

Preferably, the initial formation of the carbide-copper surface structure, and its bonding to the aforementioned ferrous substrate, are performed simultaneously. In both cases, the absence of oxygen during melting of the copper is important to prevent the formation of oxides in either the carbide-copper bond or the copper-ferrous metal bond. Although an oxygen-free atmosphere can be obtained satisfactorily in numerous ways, such as by the use of a suitable flux or a heating chamber flooded with an inert gas while the copper is melted, it is preferable that the melting of the copper take place in a vacuum furnace so that subatmospheric pressure encourages the high flowability of the copper, causing it to fill every vacancy in a capillary-like manner thereby further improving the strength of the bond. Preferably, a subatmospheric pressure substantially no greater than about $10^{-3}$ torr, and more preferably about $10^{-4}$ torr, is used.

The result of the foregoing features of the present invention is a fully quenchable, highly wear-resistant and impact-resistant carbide surface structure, bondable to a ferrous tool which can ultimately be quenched to full hardness after such bonding without adversely affecting the wear-resistant surface structure. Moreover, the attachment of the surface structure to the tool can be accomplished with an equally impact-resistant and thermal-resistant bond, either simultaneously with the initial formation of the surface structure or, for convenience, at a later time after the surface structure has been formed.

Other significant features of the present invention can be employed not only with the abovedescribed carbide-containing surface structure bound by a matrix of essentially pure copper, but also with carbide-containing surfaces bound by a wider range of matrix materials if the application of the surface structure does not require its exposure to quenching, thereby eliminating the need for the aforementioned thermal shock resistance characteristic. Such other matrix materials, in the absence of exposure to quenching, can include, for example, all of those mentioned in U.S. Pat. No. 2,833,638 discussed above and incorporated herein by reference.

One of the features of the present invention usable with a wider range of matrix materials is the feature whereby containment of the carbide particles, while the matrix material is molten, is accomplished by the use of refractory sheet materials to eliminate the need for machined cavities in the base metal. These sheet materials are capable of maintaining their strength at the high molten temperatures of the matrix materials because of their even higher melting points, and yet are not wettable by the molten matrix material, i.e. they repel the liquid matrix material because they do not reduce the surface tension of the molten liquid sufficiently to enable the liquid to spread over their surfaces. This nonwettability prevents the containment materials from being brazed or otherwise adhered to the carbide-containing surface structure, or to the base metal, upon solidification of the matrix. Preferably, the containment materials should also be flexible so that they are unaffected by the difference between their own coefficients of thermal expansion and that of the base metal upon which the carbide-containing surface is to be formed. Also, optimally, the materials are susceptible to easy fastening in place, can be made highly flexible so as to be formable around parts of widely-varying shape or curvature, and are inexpensive and thus disposable. Containment materials capable of satisfying most or all of these requirements include graphite and ceramic sheet materials. If graphite is used, flexibility is limited and the cost of materials and fabrication tends to be high, but graphite sheets can be used in vacuum or inert atmosphere furnaces at temperatures beyond 3000° F. Ceramic sheet materials, on the other hand, comprising alumina (dominant percentage) and silica fibers and powders pressed under high pressure, satisfy virtually all of the foregoing requirements. Such sheet materials are available, for example, under the trademark FIBERFRAX in both highly flexible paper and less flexible board forms from Sohio Engineering Materials Company of Niagara Falls, N.Y., and are designed to maintain strength and integrity up to 2300° F. and beyond depending upon the composition of the refractory, temperature resistance generally becoming greater as the alumina content becomes higher. The ceramic paper and board sheets ar flexible enough to be fastened closely to the base metal without cracking despite the differences in coefficients of thermal expansion, and are easily fastened into virtually any configuration by a refractory water-based ceramic cement consisting essentially of a colloidal dispersion of alumina and silica powders in water, available for example also under the trademark FIBERFRAX as "QF-180 coating cement." In their paper form, the ceramic sheets are highly bendable and can flexibly conform to small radii of curvature and assume a wide variety of configurations without fracture.

A further feature, likewise applicable to such wider range of matrix materials, is the use of a ferrous mesh or screen material as a substrate for the carbide-containing surface structure, such ferrous mesh or screen both serving to hold the carbide particles in place before (and during) melting of the matrix material, and serving as a substrate for a resultant sheet-like surface structure which can be used for lining and overlaying, which is weldable, and which may also be bendable for coverage of contoured components.

A still further feature of the present invention, applicable to the aforementioned wider range of matrix materials, involves the repair of carbide-containing surfaces. Although the carbide particles may be torn from the matrix material in use, sometimes together with patches of the matrix, it has been found that the damaged surface structure can be returned to full usefulness by distributing carbide particles and the matrix material substantially uniformly over the damaged area and subjecting the surface structure to the same melting and hardening sequence used in the original formation of the surface structure. The replacement carbide particles and matrix material are incorporated integrally into the previous surface structure by bonding thereto in such a way that there is no substantial difference between the original surface structure and the repaired structure.

The foregoing and other features, objectives and advantages of the present invention will be more readily understood upon consideration of the description and examples which follow, taken in conjunction with the accompanying drawings.

DETAILED DESCRIPTION OF THE INVENTION

Figure 1:
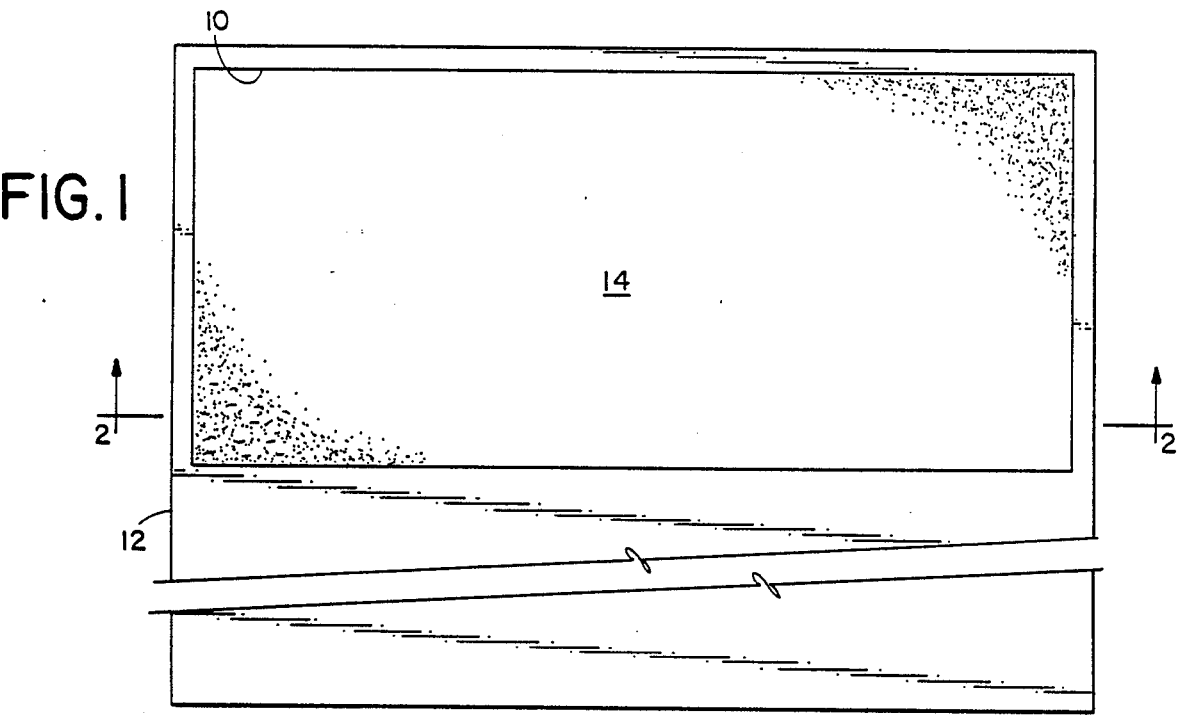
FIGS. 1 and 2 are plan and sectional views, respectively, showing the exemplary formation of a wear-resistant surface structure in accordance with the present invention within a cavity of a steel plate to which it is simultaneously bonded.

The carbide particles used in the present invention can be any one or more of a large variety of well-known wear-resistant carbides, such as tungsten carbide, tantalum carbide, titanium carbide, niobium carbide, vanadium carbide, boron carbide, chromium carbide, molybdenum carbide, or mixtures thereof, such list being merely exemplary and not exclusive. The carbide particles can be either in cemented, sintered form, bound by a cement such as cobalt and having a high inherent fracture toughness, or uncemented, cast carbide which has a higher wear-resistance than the cemented type but a lesser fracture toughness, making it suitable for lower-stress applications. For the highest fracture toughness, cobalt bearing tungsten carbide is preferred, there being several commercial grades ranging in cobalt percentages as low as three percent to as high as thirty percent by weight, but typically in the range from five percent to fourteen percent by weight, and having a hardness range of 81 Ra to 92 Ra, all compatible with the present invention.

The preferred size ranges of the carbide particles are generally about 4 to 35 mesh size for the carbide granules, and generally about 35 to 120 mesh size for the carbide powders. The granules may be used without the powders, and the powders may be used without the granules, in any particular surface structure depending on its desired texture. However, when the granules are used, it is preferred, but not critical, that the powders also be used to impart a wear-resistance to the copper matrix which binds the granules together.

The essentially pure copper employed in the matrix of the surface structure may be in one or more of many different forms. If copper powder is used, it will preferably be about minus 200X down mesh size. If copper pellets are used, they are preferably about 6 to 25 mesh size. If granulated copper is used, it is preferably in shredded form consisting of thin fibers or wafers of about 4 to 8 mesh size. If chopped copper nuggets are used, they are preferably about 4 to 8 mesh size. Copper mesh and foil can also be used, as well as copper in other forms. The powdered copper works particularly well in conjunction with the powdered carbide to achieve the uniform distribution of the carbide powder throughout the copper matrix when desired to maximize the wear-resistance of the copper matrix.

The ratio of carbide to matrix material, by weight in all forms, in the wear-resistant surface structure is preferably in the range of about 1.25:1 to 3:1.

Melting of the copper in an oxygen-free atmosphere will preferably take place in the temperature range of about 1985° F. to 2175° F. Subsequent quenching can take place, after the copper is hardened, by immersing it and its attached ferrous tool in a quenching fluid while the tool is within the austenitizing temperature range (about 1600° F. to 1800° F.). If the surface structure is initially formed simultaneously with bonding to the tool, quenching can occur during initial cooling of the surface structure and tool from the copper melting point, if desired. Otherwise, quenching can occur by subsequent heating of the carbide-copper surface structure, together with its attached tool, to the austenitizing temperature followed by immersion in the aforementioned fluid. The latter sequence would normally be used when the initial formation of the wear-resistant surface structure does not occur simultaneously with its attachment to the tool, such attachment occurring subsequently. Any common quenching media can be used, such as oil, water, synthetic polymers, or air.

It is significant that the copper, besides bonding the carbide particles together, also covers them with a protective copper coating sufficient to prevent any significant harmful oxidation of the carbide particles during the subsequent quenching process.

In some embodiments of the invention, it is preferable to mix the carbide particles and copper with a liquid brazing cement or binder such as polyisobutadiene or other suitable aliphatic and/or isoparaffinic hydrocarbon, in order to form a paste holding the carbide and copper in proper placement and distribution relative to each other and to a substrate, preparatory to melting and hardening of the copper. Use of some of the copper in screen or mesh form is also useful to hold the components in place.

In many of the embodiments of the invention, the surface structure is formed prior to its attachment to the tool for which it is intended, rather than simultaneously therewith. In such cases the surface structure can either be cast in a mold without a ferrous substrate, or formed on any of several different types of ferrous substrates such as plates, wear coupons, channels or screens. The use of ferrous screens in particular can be employed to produce carbide-bearing sheets of varying thicknesses, which can be welded or otherwise adhered to surfaces exposed to high wear. The carbide-bearing sheets can be used for lining chutes, lining the interiors of earth-moving buckets, overlaying batch asphalt mixer paddle tips, overlaying the working ends of digging teeth, and the like. Depending upon the carbide grain size used in the sheets, the sheets may be bent for convenient coverage of contoured components. For producing a carbide-bearing sheet having a higher degree of flexibility, copper screen rather than ferrous screen can be used.

In the following examples, which are not intended to be exclusive, the carbide particles and copper are all subjected to the following thermal cycle in an IPSEN vacuum heat-treating furnace: raise the temperature to 1800° F. in a vacuum of $10^{-4}$ torr (although up to about $10^{-3}$ torr would be satisfactory), and dwell at 1800° F. for one hour; raise the temperature to 2050° F. and dwell at 2050° F. for 15 minutes; backfill the furnace with nitrogen, turn off the power, and allow the furnace to cool to room temperature before removing the parts (the dwell times at 1800° F. and at 2050° F. will vary depending upon the size of the load introduced into the vacuum furnace).

EXAMPLE I

Figure 2:
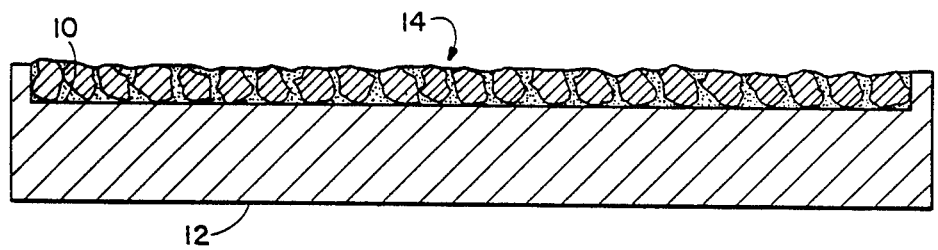

With reference to FIGS. 1 and 2, a cavity 10 was machined into a $4\frac{1}{2}''\times 3''\times \frac{1}{4}''$ rectangular mild steel plate 12; the cavity measured $4\frac{1}{4}''\times 1\frac{1}{4}''\times 3/16''$ deep. Copper foil, 0.005" thick, was cut to shape and placed in the bottom of the cavity, followed by a mixture of one ounce of 6 to 10 mesh crushed sintered (cemented) tungsten carbide, one ounce of 60 to 100 mesh crushed cast (uncemented) tungsten carbide, one ounce of copper pellets, and liquid polyisobutadiene brazing cement (sold under the designation Adsol 1290R by Alloy Metals, Inc. of Troy, Mich.) to form a gravel-like paste. After undergoing the aforementioned vacuum furnace cycle, a section was cut through the matrix of the resultant surface structure 14 using wire EDM. The microstructure revealed that the 60 to 100 mesh carbide was uniformly dispersed throughout the copper matrix accompanied by a distribution of 6 to 10 mesh tungsten carbide, fully bonded. No evidence of gaps or voids in the matrix was observed indicating extremely high fluidity of the copper under vacuum conditions.

EXAMPLE II

A cavity was machined into a $4\frac{1}{2}''\times 3''\times \frac{1}{4}''$ rectangular mild steel plate similar to that shown in FIGS. 1 and 2; the cavity measured $4\frac{1}{4}''\times 1\frac{1}{4}''\times \frac{1}{8}''$ deep. A mixture was prepared of $1\frac{1}{2}$ ounce of 6 to 8 mesh crushed sintered tungsten carbide, $1\frac{1}{2}$ ounce of 25X down mesh crushed sintered tungsten carbide, $\frac{1}{3}$ ounce of 60 to 100 mesh cast tungsten carbide, $\frac{1}{8}$ ounce of fine copper powder, 1 ounce of chopped copper, and Adsol 1290R liquid added to obtain thorough adhesion and distribution of the 60 to 100 mesh cast carbide, forming a gravel-like paste. After undergoing the aforementioned vacuum furnace cycle, a section was cut through the matrix using wire EDM. The microstructure revealed that the 60 to 100 mesh tungsten carbide was dispersed throughout the copper matrix accompanied by a distribution of 6 to 8 mesh and 25X down mesh tungsten carbide, fully bonded. No evidence of gaps or voids in the matrix was observed.

EXAMPLE III

Figure 3:
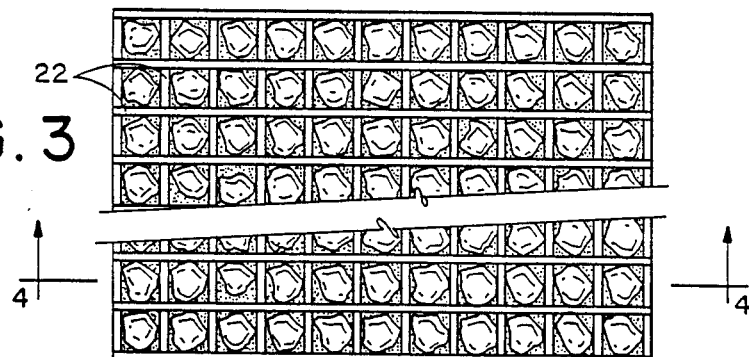
FIGS. 3 and 4 are plan and sectional views, respectively, showing the exemplary coating of a nonweldable white iron plate with a wear-resistant surface structure in accordance with the present invention, the surface structure being formed while it is simultaneously bonded to the white iron plate and while the white iron plate is simultaneously bonded to a weldable steel plate.
Figure 4:
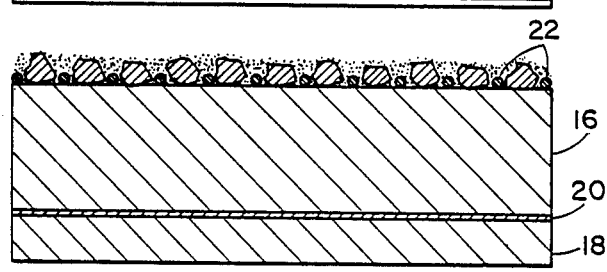

With reference to FIGS. 3 and 4 (shown prior to melting of the copper), a $3''\times 2''\times 3/8''$ platelet 16 cast out of martensitic chromium-bearing white iron was placed on a $\frac{1}{8}''$ thick mild steel plate 18 with 0.005" copper foil 20 in between the two parts. Eight-mesh copper screen 22 was then placed over the white iron platelet 16. The assembly was lightly dusted with a mixture of 4 ounces of powdered copper and 4 ounces of 60 to 100 mesh cast tungsten carbide powder. Six to 10 mesh crushed sintered tungsten carbide was placed within the hole spacings of the copper mesh. The copper mesh containing the 6 to 10 mesh tungsten carbide was covered with $\frac{1}{8}$ ounce of the aforementioned powdered copper and cast tungsten carbide powder mixture. After undergoing the aforementioned vacuum furnace treatment, it was noted that the copper screen had held the 6 to 10 mesh crushed sintered tungsten carbide in place prior to and during the melting of the copper screen itself. A microscopic examination of the surface revealed the presence of the 6 to 10 mesh crushed sintered tungsten carbide and the 60 to 100 mesh cast tungsten carbide firmly embedded within and becoming an internal part of the copper matrix. Repeated heavy hammer blows demonstrated the toughness of the copper/carbide composite and also revealed the high resistance to delamination from the chromium-bearing white iron substrate.

EXAMPLE IV

In order to determine the shear strength between the martensitic chromium-bearing white iron brazed with pure copper to mild steel, two specimens were prepared of duplicate design. Each shear test specimen consisted of a chrome white iron casting measuring $1\frac{1}{2}''\times 1\frac{1}{2}''\times \frac{1}{2}''$ placed on top of a piece of mild steel measuring $4''\times 5''\times \frac{1}{2}''$, separated by a layer of copper foil, 0.005" thick. These assemblies were given the aforementioned vacuum furnace thermal cycle treatment. The two specimens were subjected to a shear test. Specimen number one broke within the mild steel structure, not at the chrome white iron/steel bond, at 33,750 pounds pull; the number two specimen sheared at the chrome white iron/steel bond interface at 36,150 pounds pull. This test confirmed the initial premise that the interface structures of the copper/carbide/steel combination possessed extremely high integrity and strength.

EXAMPLE V

Figure 5:
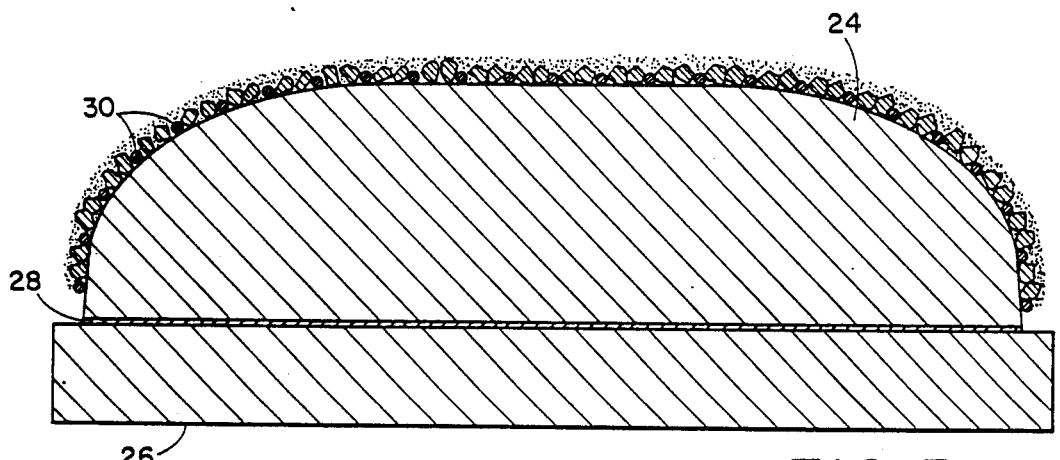
FIG. 5 is a sectional view showing the exemplary coating of a cast white iron wear coupon with a wear-resistant surface structure in accordance with the present invention, such surface being bonded to the coupon simultaneously with its formation and simultaneously with the bonding of the coupon to a weldable steel plate.

With reference to FIG. 5 (shown prior to melting of the copper), a semi-hemispherical wear coupon 24 measuring $3\frac{1}{2}''$ in diameter by $\frac{3}{4}''$ thick, made out of cast martensitic chromium-bearing white iron, was placed on a 3 5/8" diameter by 5/16" thick mild steel plate 26 with 0.005" copper foil 28 in between the two parts. A piece of eight-mesh copper screen 30 was then formed over the white iron wear coupon and tied down with three strands of copper wire. The assembly was lightly dusted with a mixture of 4 ounces of powdered copper and 4 ounces of 60 to 100 mesh cast carbide powder. 25X down mesh crushed sintered tungsten carbide was placed within the hole spacings of the copper mesh. The copper mesh containing 25X down mesh tungsten carbide was covered with ¼ ounce of the aforementioned powdered copper and cast tungsten carbide powder mixture. After undergoing the aforementioned vacuum furnace treatment it was noted that the copper screen had held the 25X down mesh crushed sintered tungsten carbide in place on the contoured wear coupon semi-hemispherical surface prior to and during the melting of the copper screen itself. A microscopic examination of the surface revealed the presence of the 25X down mesh crushed sintered tungsten carbide and the 60 to 100 mesh cast tungsten carbide firmly embedded and becoming an integral part of the copper matrix, securely bonded to the chrome white iron. Repeated hammer blows demonstrated the toughness of the copper/carbide composite and also revealed the high resistance to delamination from the chromium-bearing white iron substrate.

EXAMPLE VI

Same as Example V except that the semi-hemispherical wear coupon measured 2⅜" in diameter by ½" thick, and was placed on a 2½" diameter by ¼" thick mild steel plate with 0.005 copper foil in between the two parts.

EXAMPLE VII

Figures 6, 7:
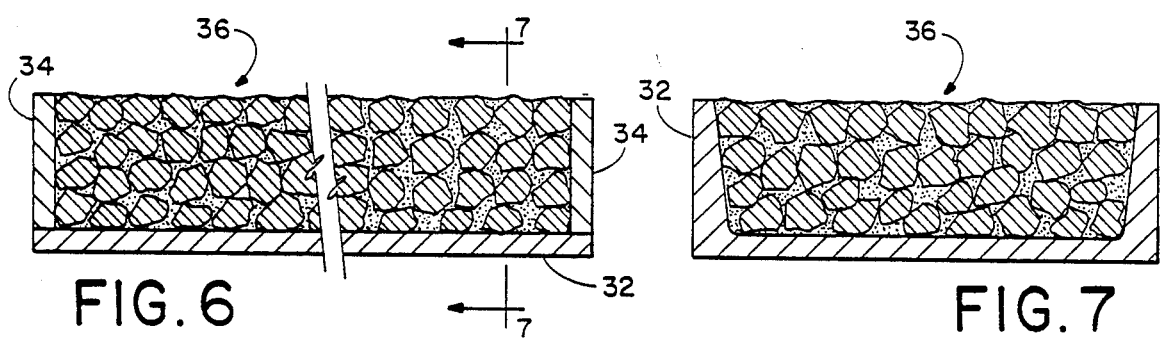
FIGS. 6 and 7 are sectional views showing the exemplary formation of a wear-resistant surface structure in accordance with the present invention within a steel channel, the surface structure being formed simultaneously with its bonding to the steel channel.

With reference to FIGS. 6 and 7, a steel channel 32, 1½" wide by ¼" high by 3" long, sealed at both ends with a zirconia plate 34, was filled with a mixture of 1¾ ounce 4 to 8 mesh crushed sintered tungsten carbide, 1 ounce granulated copper, ½ ounce powdered copper, ½ ounce 35 to 70 mesh tungsten carbide pellets, ¼ ounce 60 to 100 mesh cast tungsten carbide, and Adsol 1290R liquid added to form gravel-like mix. One-sixth ounce of granulated copper was distributed on top of the mixture residing within the steel channel. After undergoing the aforementioned vacuum furnace treatment it was noted that the mass mixture had melted uniformly into a surface structure 36 providing an impact-resistant and highly abrasion-resistant dual-component wear bar capable of being welded to a metal substrate.

EXAMPLE VIII

Figure 8:
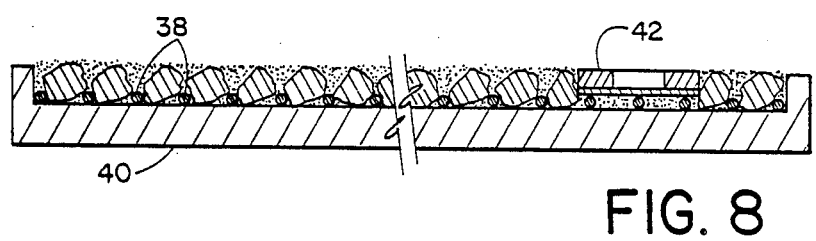
FIG. 8 is a sectional view showing the exemplary formation of a wear-resistant surface structure in accordance with the present invention on a steel screen substrate, the surface structure being formed simultaneously with its bonding to the steel screen.

With reference to FIG. 8 (shown prior to melting of the copper), an eight-mesh high carbon steel screen 38 measuring 12"×12" was placed over a 12"×12"×¼" steel plate 40 previously coated with a ceramic air-drying liquid designed to establish a nonwetting barrier. The screen was clamped to the steel plate with steel washers, such as 42, placed under the clamps and 0.005" copper foil existing between the washers and screen for copper-brazed adherence during processing. The assembly was dusted with a mixture of 4 ounces copper powder and 7 ounces of 60 to 100 mesh crushed sintered tungsten carbide. Eight ounces of 8 to 10 mesh crushed sintered tungsten carbide was distributed across the screen in such a manner as to cause the carbide to become trapped by the holes in the screen. Four ounces of granulated copper were distributed evenly over the top of the 8 to 10 mesh carbide. The assembly was exposed to the aforementioned vacuum furnace treatment. Upon cooling and removal from the steel plate 40, an examination showed the formation of a highly-dense carbide-bearing sheet capable of being welded to steel substrates or fixtures by means of plug-welding through the steel orifices formed by the steel washers.

EXAMPLE IX

Same as Example VIII except that 12 to 20 mesh crushed sintered tungsten carbide was used in place of the 8 to 10 mesh tungsten carbide.

EXAMPLE X

Same as Example VIII except that an alumina-silica sheet, trademarked Lytherm, was used to form a nonwetting barrier instead of the ceramic wash on the steel plate 40.

EXAMPLE XI

Same as Example IX except that an alumina-silica sheet, trademarked Lytherm, was used to form a nonwetting barrier instead of the ceramic wash on the steel plate 40.

EXAMPLE XII

Same as Example X except that a 10-mesh high carbon steel screen was used instead of an 8-mesh high carbon steel screen.

EXAMPLE XIII

Same as Example X except that a 12-mesh high carbon steel screen was used instead of an 8-mesh high carbon steel screen.

EXAMPLE XIV

Same as Example X except that a 10-mesh T-304 stainless steel screen was used instead of an 8-mesh high carbon steel screen.

EXAMPLE XV

Figure 9:
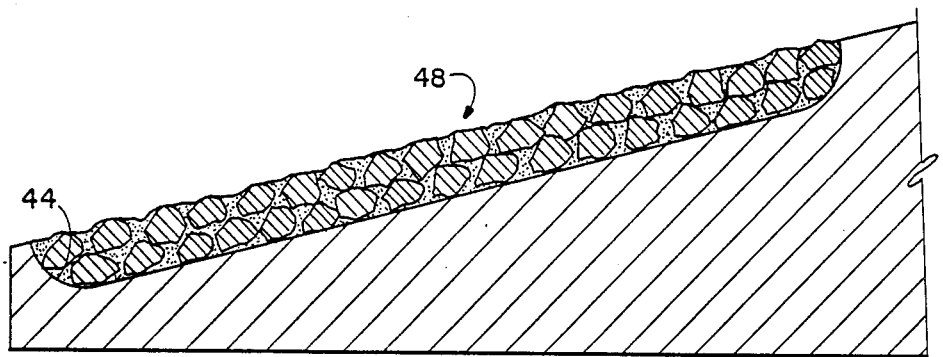
FIGS. 9 and 10 are side and top views, respectively, showing the formation of a wear-resistant surface structure in accordance with the present invention within a cavity formed in a ripper point, such surface structure being formed simultaneously with its bonding directly to the ripper point.
Figure 10:
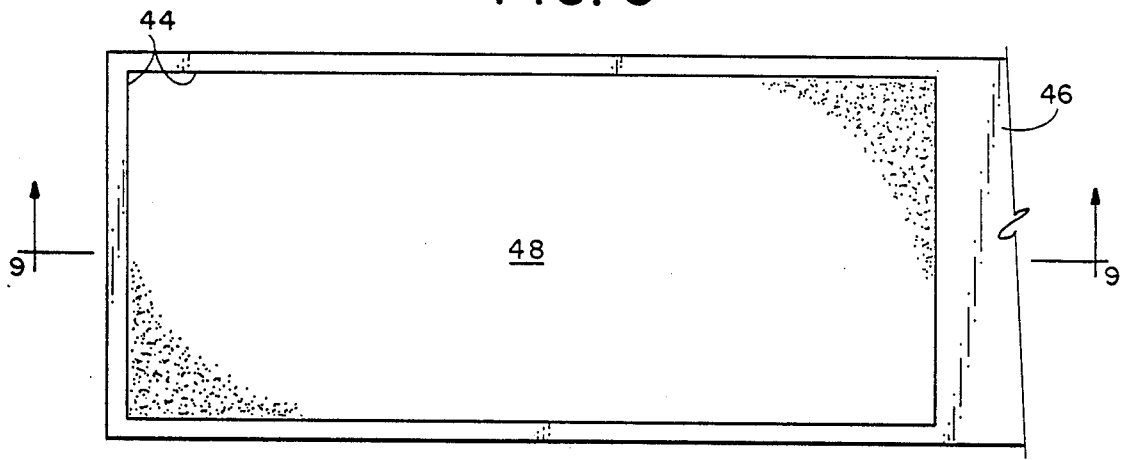

With reference to FIGS. 9 and 10, a pocket 44, 3"×4½"×⅜", was machined in the leading edge of a cast steel ripper point 46 used in earthmoving applications. Two ounces of granulated copper was distributed evenly in the base of the pocket. This was followed by placing into the pocket a mixture of 3 ounces of 60 to 100 mesh crushed sintered tungsten carbide powder, 5½ ounces of powdered copper, 10½ ounces of 4 to 8 mesh crushed sintered tungsten carbide, 5 ounces of granulated copper, and Adsol 1290R liquid, forming a gravel-like paste. After undergoing the aforementioned vacuum furnace treatment, the cast steel ripper point was heated to 1750° F. for one hour in a standard heat-treating furnace, subsequently taken out of the furnace, quenched in water until cold to touch, then reheated for five hours at 400° F., and allowed to air cool to room temperature. No cracks or tears were observed in the copper/carbide composite surface structure 48.

EXAMPLE XVI

The cavity-bearing plates, as described in Examples I and II, with their carbide/copper surface structures, were placed into a standard heat treating furnace and heated to 1700° F. The plates were then allowed to remain at 1700° F. for 15 minutes at which time they were extracted from the furnace and quickly immersed into a tank of water and vigorously quenched to room temperature. A thorough examination under a microscope revealed a complete absence of cracks or fissures in the carbide/copper structure.

EXAMPLE XVII

Figure 11:
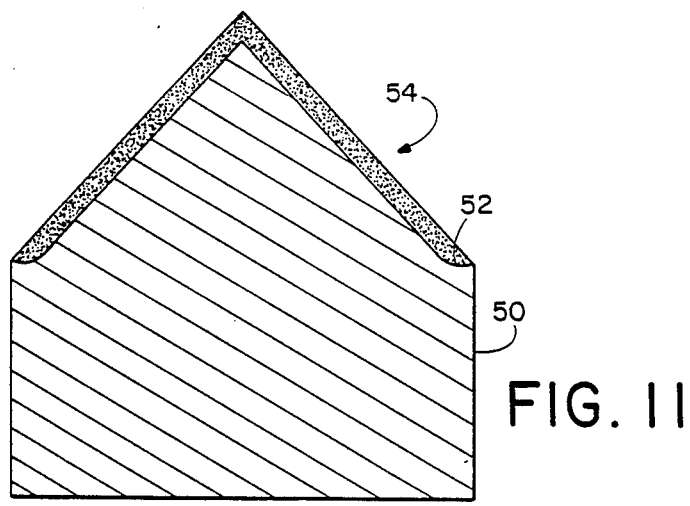
FIG. 11 is a sectional view showing the exemplary coating of a conical debarking spike with a surface structure in accordance with the present invention, the surface structure being formed simultaneously with its bonding directly to the debarking spike.

With reference to FIG. 11, a debarking spike 50 was machined out of mild steel. The cylindrical pointed end was machined in such a way as to provide a recessed area 52 for a tungsten carbide and copper mixture composed of a seven-to-four by weight ratio of 60 to 100 mesh crushed sintered tungsten carbide and powdered copper, mixed with Adsol 1290R liquid to form a paste-like mixture, which was applied to the cylindrical pointed end After undergoing the aforementioned vacuum furnace treatment, it was observed that the combined mixture forming the surface structure 54 had remained intact on the 45-degree surface, without evidence of any sloughing or melt-down over the balance of the debarking spike.

EXAMPLE XVIII

Figure 12:
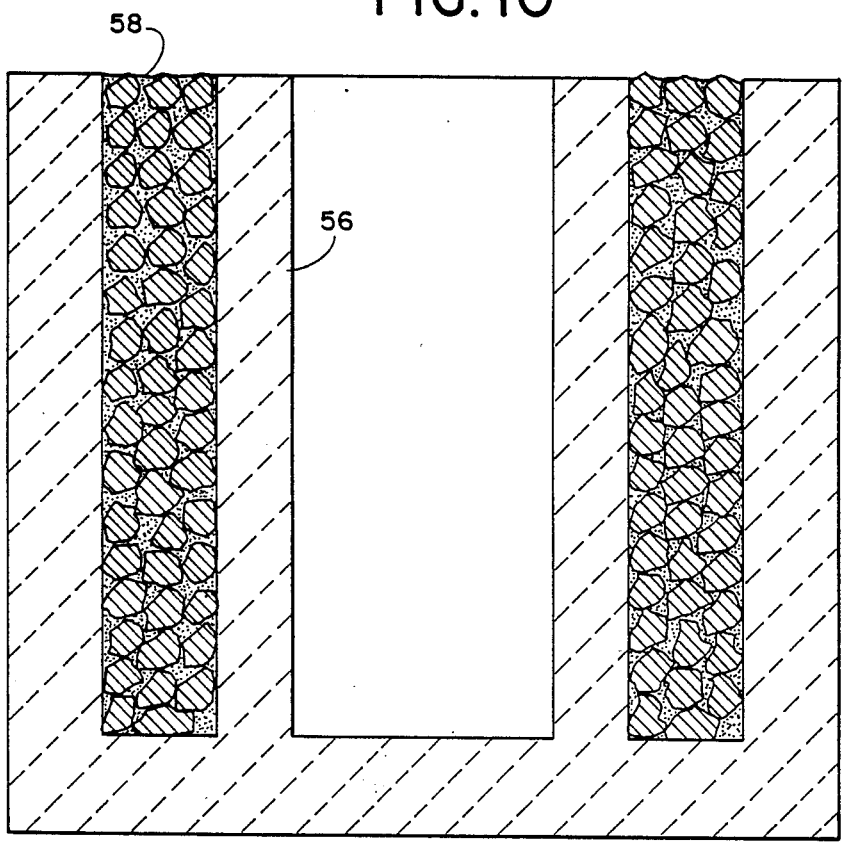
FIG. 12 is a sectional view showing the exemplary formation of a surface structure in accordance with the present invention by casting thereof in a ceramic mold.

With reference to FIG. 12, a ceramic mold 56 was created containing a cylindrical cavity measuring 3" OD by 2¼" ID by 2⅝" high. The ceramic mold measured 3¾" OD by 3" high and weighed 2 pounds 7 ounces. The mold cavity was filled with a mixture 58 comprised of 14 ounces of 6 to 10 mesh crushed sintered tungsten carbide, 13 ounces of a mixture of a seven-to-four by weight ratio of 60 to 100 mesh sintered tungsten carbide and powdered copper, and 13 ounces of granulated copper, thoroughly mixed together with Adsol 1290R liquid. After undergoing the aforementioned vacuum furnace treatment, the ceramic mold material was broken off revealing a cast structure of the aforementioned tungsten carbide and copper, suitable for brazing to a ferrous substrate.

EXAMPLE XIX

Figure 13A:
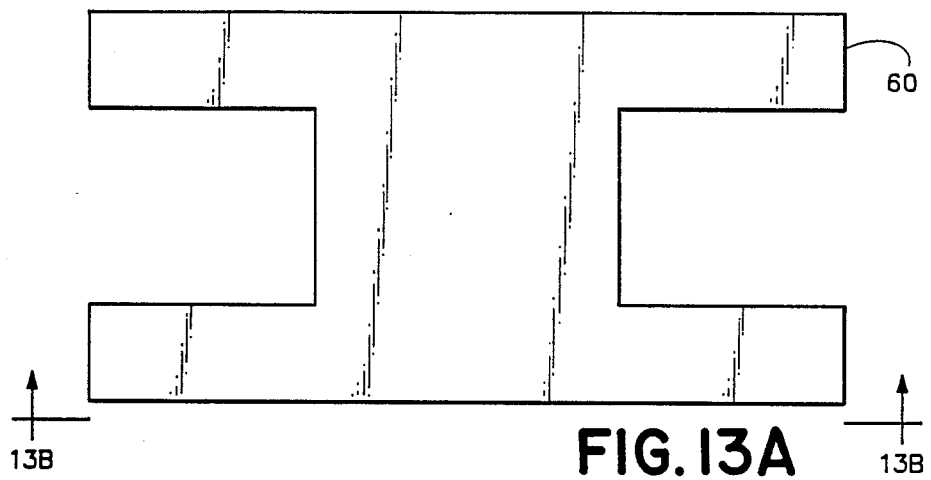
FIGS. 13A-D are top and side views showing the exemplary formation of a surface structure in accordance with the present invention on a curved supporting surface by use of ceramic sheet refractory containment materials.
Figure 13B:
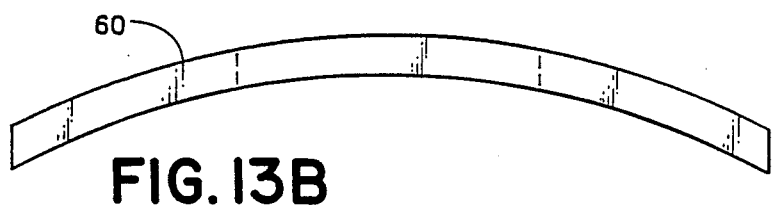
Figure 13C:
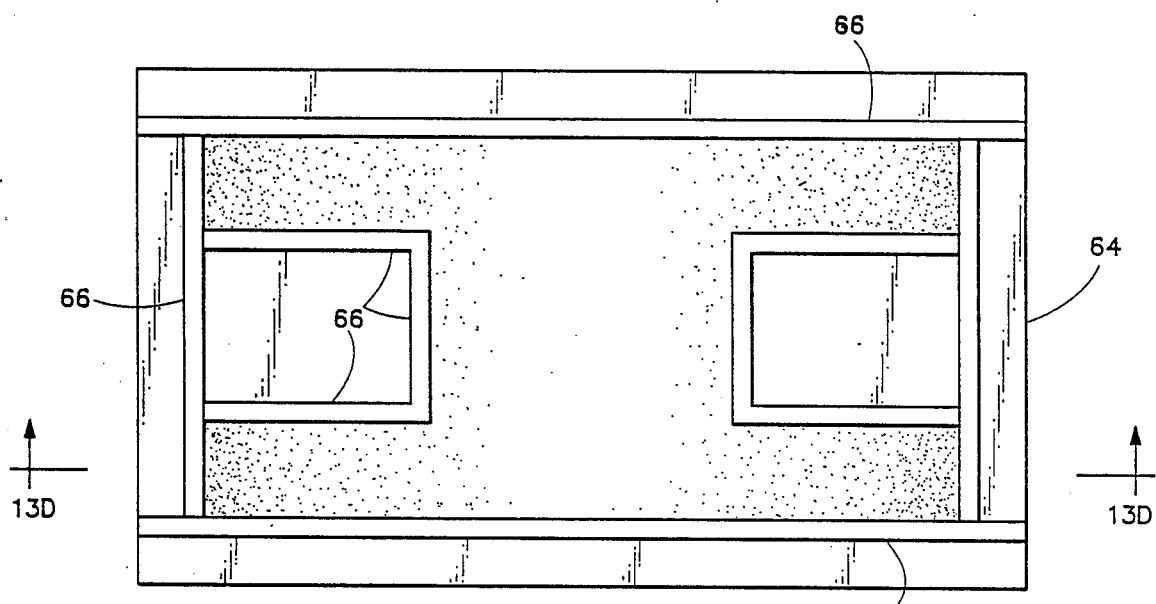
Figure 13D:
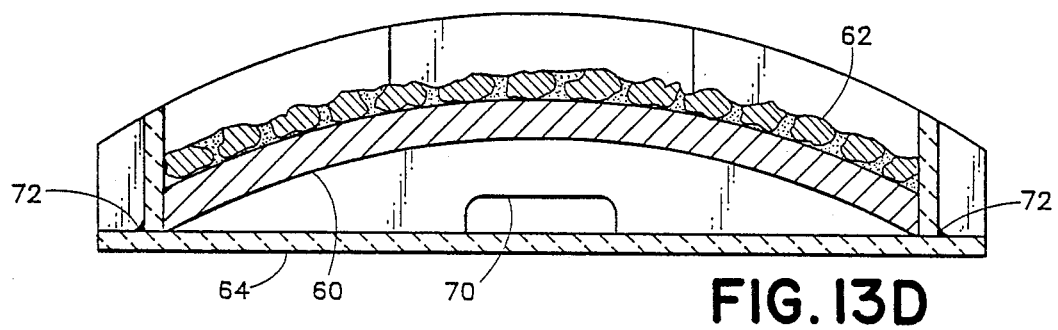
Figure 14A:
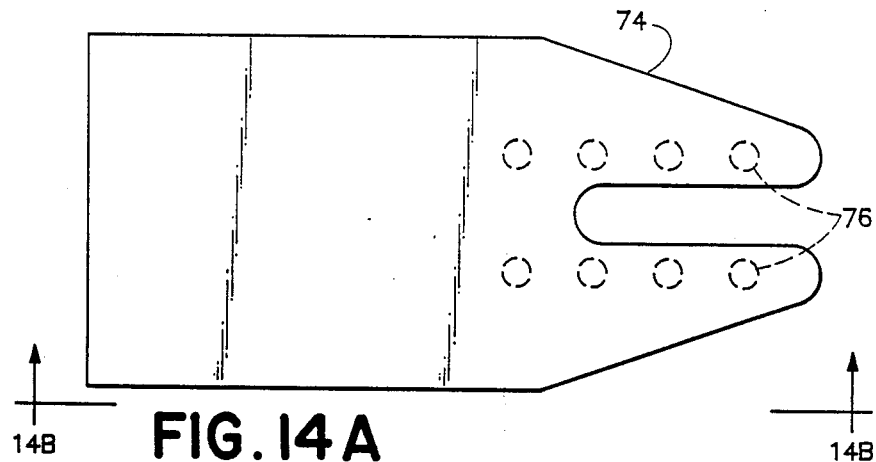
FIGS. 14A-D are top and side views showing the exemplary formation of a surface structure in accordance with the present invention on a fan blade by the use of ceramic sheet refractory containment materials, illustrating the use of such materials to prevent unintended coating of threaded bolts by molten matrix material.
Figure 14B:
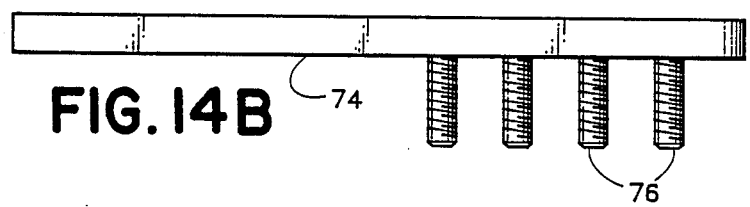
Figure 14C:
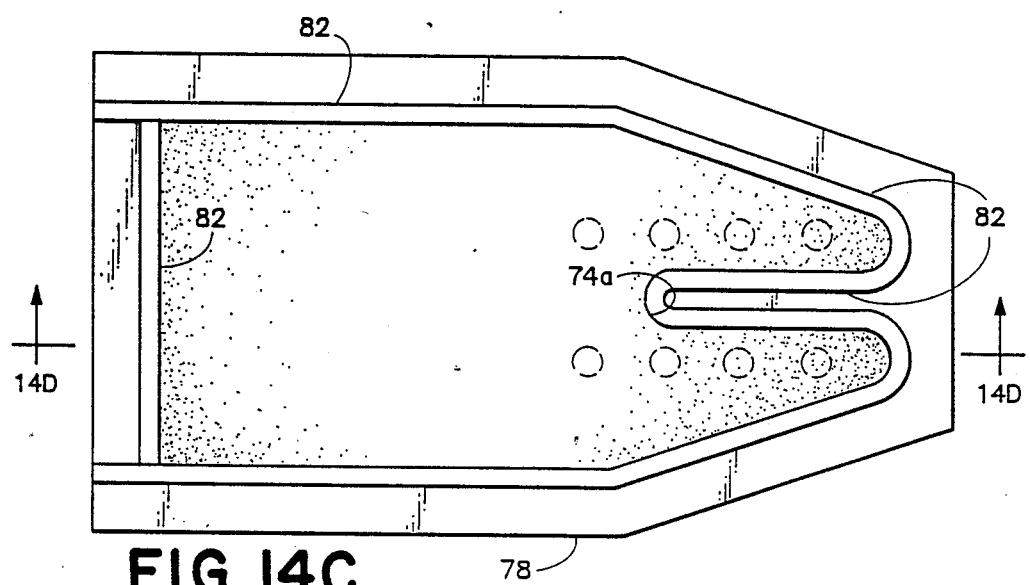
Figure 14D:
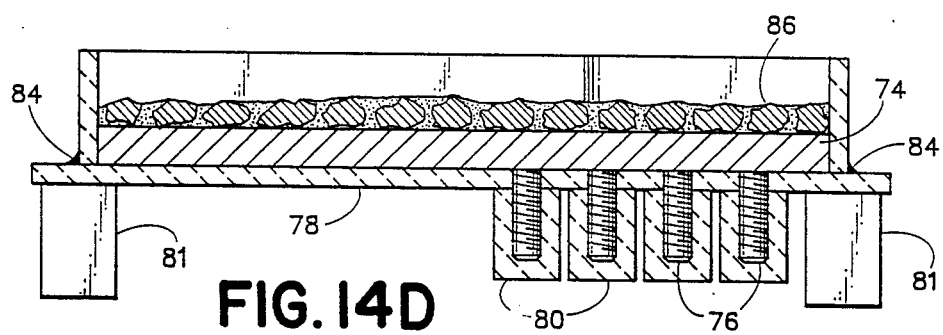

With reference to FIGS. 13A-D, a steel H-section adapter wear cap 60 upon which the carbide-containing surface structure is to be mounted has a radius that normally would cause portions of a crushed sintered tungsten carbide and copper mixture 62, comparable to that described in Example I or II, to slide off of the part during vacuum furnace operation when the copper is molten. Moreover, some of the large carbide particles near the edges of the member 60 would tend to roll off the edges while in the furnace, creating gaps in the edges of the resultant carbide-containing surface structure. Initially the upper convex surface of the member 60 is ground until all surface defects are removed, down to the base metal. All oil or grease possibly present is removed with acetone. A bottom plate 64 of ceramic refractory board material approximately ¼ inch thick, of the type previously described herein, is placed beneath the H-section member 60. Sidewalls 66 of the same ceramic board material are cut to conform to the outer surface of the H-shaped member 60 so as to create a containment cavity above the upper surface of the member 60 as seen in FIGS. 13c and 13d. Apertures 70 are cut in the sidewalls 66 for lifting purposes. The previously-described ceramic water-based cement is liberally applied at 72 to the bottom plate 64 by hypodermic syringe in the regions contacted by the sidewalls 66. Common straight pins are used to hold the sidewalls in position while the ceramic containment system is allowed to air dry for two days. (The drying action can be accelerated by placing the member 60 and its ceramic containment assembly into an oven set at approximately 160° F.) After drying, the carbide-copper mixture 62 is placed into the cavity formed by the ceramic containment assembly as shown in FIG. 13D and the entire unit is subjected to the aforementioned vacuum furnace cycle. After the furnace cycle, the carbide layer is intact with minimal spilling of the carbide and copper mixture off of the edges of the member 60 and no evidence of the carbide and copper mixture sloughing off of the inclined surfaces of the member 60. The expansion of the steel member 60 pushes the ceramic sidewalls 66 away by approximately ¼ inch. Yet, the ceramic sidewalls 66 contain the carbide and copper mixture completely throughout the liquefaction of the copper matrix material and its subsequent solidification.

In place of the ceramic sidewalls 66 and bottom plate 64, graphite sheets alternatively could have been used. These would preferably be of flexible graphite material to avoid cracking due to the differences in coefficients of thermal expansion of the steel member 60 and graphite sheets, respectively. The fastening of the sheets together would be accomplished by cutting slots in the bottom plate to matingly receive the bottom edges of the sidewalls.

EXAMPLE XX

With reference to FIGS. 14A-D, a steel fan blade 74 for a coal-fired power plant is shown having eight bolts 76 protruding from the side of the blade 74 opposite to that upon which the carbide-containing surface is to be mounted. In addition to the problem of preventing carbide particles from rolling off of the edge of the member 74 when the matrix metal is molten, the bolts 76 must be protected against being coated by the molten matrix metal which would render the part unusable. In this case, a bottom plate 78 of the aforementioned ceramic board material is glued, using the aforementioned ceramic water-based cement, to the bolt side of the blade 74 after holes are drilled into the board 78 to accommodate the passage of the eight bolts. Flexible ceramic paper material 80 of the type previously described, approximately ⅛ inch thick, is then dipped into the cement and subsequently wrapped around the bolt threads and affixed by rubber bands. This assembly is allowed to dry in air (or for four hours in an oven set at 160° F.), and is then inverted and mounted on supporting steel blocks 81. Flexible ceramic paper material 82 is glued by the cement 84 around the outer periphery of the fan blade 74 to create containment sidewalls. The ceramic paper is simply bent to conform to the sharp radius 74a. A layer of carbide and copper mixture 86, comparable to that described in Example I or II, is placed on the upper surface of the blade 74 to form a one-eighth inch deep layer, and the entire assembly is subjected to the aforementioned vacuum furnace cycle. Upon completion of the cycle, the ceramic paper material is easily removed from the threaded bolts by means of wire brushing or sandblasting with soft glass-like grit, and the other ceramic paper and board materials are easily separated from the surface structure and the fan blade.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A method of providing a ferrous tool having a wear-resistant, carbide-containing surface having high resistance to impact and thermal stress comprising:
   (a) distributing carbide particles, and a matrix material consisting essentially of pure copper, substantially uniformly over a supporting surface in contact with each other;
   (b) melting said matrix material substantially in the absence of oxygen while in contact with said carbide particles;
   (c) solidifying said matrix material by cooling thereof below its freezing point, and thereby bonding said carbide particles with said matrix materials to form said carbide-containing surface;
   (d) attaching said matrix material to a ferrous tool; and
   (e) quenching said matrix material and ferrous tool from a temperature in the austenitizing temperature range of said ferrous tool so as to harden said tool without thereby forming cracks in said matrix material.

2. The method of claim 1, including carrying out said melting step (b) at a subatmospheric pressure substantially no greater than $10^{-3}$ torr.

3. The method of claim 1 wherein said step (a) includes substantially uniformly distributing some of said carbide particles as powder of about 35 to 120 mesh size, and some of said carbide particles as granules of about 4 to 35 mesh size.

4. The method of claim 1, wherein said step (a) further includes distributing a liquid hydrocarbon binder over said supporting surface to bind said carbide particles into a paste to hold them in place.

5. The method of claim 1 wherein said supporting surface is ferrous, wherein said step (b) comprises heating said matrix material, said carbide particles, and the ferrous supporting surface simultaneously in the absence of oxygen to the melting point of said matrix material while said matrix material is in contact with said supporting surface, and wherein said step (c) comprises bonding said matrix material to said ferrous supporting surface as well as to said carbide particles.

6. The method of claim 5 wherein said ferrous supporting surface is part of said ferrous tool, and said steps (c) and (d) occur simultaneously.

7. The method of claim 5, including the further step, after step (c), of welding said ferrous supporting surface to said ferrous tool.

8. The method of claim 5 wherein said supporting surface comprises a nonweldable ferrous member supported by a weldable ferrous member and separated therefrom by a portion of essentially pure copper, said step (b) including melting said portion of essentially pure copper and said step (c) including bonding said nonweldable member to said weldable member by solidifying said portion of essentially pure copper.

9. The method of claim 1, said steps (b) and (c) comprising coating said carbide particles with said matrix material so as to minimize subsequent exposure of said carbide particles to air during quenching.

10. The method of claim 1, including the further step of surrounding said supporting surface with sidewalls extending above said supporting surface to contain said carbide particles and matrix material, said sidewalls being composed of a refractory sheet material having a melting point higher than that of said matrix material and not being wettable by said matrix material when said matrix material is in a liquid state.

11. The method of claim 1, wherein said carbide particles comprise carbide cemented by cobalt.

12. A method of providing a wear-resistant, carbide-containing surface on a ferrous substrate comprising:
   (a) distributing carbide particles and a metallic matrix material substantially uniformly over a supporting surface comprising a ferrous screen having apertures therein while preventing said carbide particles from covering predetermined portions of said screen;
   (b) melting said matrix material while in contact with said carbide particles and with said ferrous screen;
   (c) solidifying said matrix material by cooling thereof below its freezing point, and thereby bonding said matrix material both to said carbide particles and to said ferrous screen; and
   (d) connecting said predetermined portions of said screen to said ferrous substrate by welding.

13. A method of providing a wear-resistant, carbide-containing surface comprising:
   (a) distributing carbide particles and a metallic matrix material substantially uniformly over a ferrous supporting surface, including distributing some of said carbide particles and metallic matrix material in the form of particles and material previously bonded to said ferrous supporting surface by melting and subsequent freezing of said matrix material while in contact with said supporting surface and particles, and distributing some of said carbide particles and metallic matrix material in the form of particles and material not so previously bonded;
   (b) melting both the previously bonded and the previously unbonded matrix material while in contact with each other, with said carbide particles, and with said ferrous supporting surface; and
   (c) solidifying said matrix material by cooling thereof below its freezing point, and thereby bonding said previously bonded and previously unbonded matrix material to each other, to said carbide particles, and to said ferrous supporting surface.

14. A ferrous tool, having a wear-resistant surface structure having high resistance to impact and thermal stress comprising substantially uniformly-distributed carbide particles bonded together by a matrix consisting essentially of pure copper melted in the absence of oxygen while in contact with said carbide particles and then solidified, said matrix being connected at least in part by a brazed bond to a surface of said ferrous tool, said surface being in a quench-hardened state and said matrix being substantially free of cracks.

15. The structure of claim 14 wherein some of said carbide particles are substantially uniformly distributed through said matrix as powder of about 35 to 120 mesh size, and some of said carbide particles are substantially uniformly distributed through said matrix as granules of about 4 to 35 mesh size.

16. The structure of claim 14 wherein said matrix consists essentially of pure copper melted while in contact with said carbide particles, said carbide particles comprising carbide cemented by cobalt.

17. A ferrous substrate, having a wear-resistant surface structure comprising substantially uniformly-distributed carbide particles bonded together by a metallic matrix, and further including a supporting surface comprising a ferrous screen, having apertures therein, covered by said carbide particles and metallic matrix and bonded to said carbide particles by said metallic matrix, said ferrous screen having predetermined portions thereof not covered by said carbide particles, said predetermined portions being connected by welding to said ferrous substrate.

18. A method of providing a ferrous tool having a wear-resistant, carbide-containing surface having high resistance to impact and thermal stress comprising:
 (a) distributing carbide particles, and a matrix material consisting essentially of pure copper, substantially uniformly over a supporting surface in contact with each other, and placing a copper screen over said supporting surface as part of said matrix material to hold said carbide particles in place;
 (b) melting said matrix material, including the copper of said screen, substantially in the absence of oxygen while in contact with said carbide particles;
 (c) solidifying said matrix material, including the copper of said screen, by cooling thereof below its freezing point, and thereby bonding said carbide particles with said matrix materials to form said carbide-containing surface;
 (d) attaching said matrix material to a ferrous tool; and
 (e) quenching said matrix material and ferrous tool from a temperature in the austenitizing temperature range of said ferrous tool so as to harden said tool without thereby forming cracks in said matrix material.

19. A method of providing a ferrous tool having a wear-resistant, carbide-containing surface having high resistance to impact and thermal stress comprising:
 (a) distributing carbide particles, and a matrix material consisting essentially of pure copper, substantially uniformly over a ferrous screen in contact with each other;
 (b) heating said matrix material, said carbide particles, and said ferrous screen simultaneously in the absence of oxygen to the melting point of said matrix material, while said matrix material is in contact with said ferrous screen and with said carbide particles, so as to melt said matrix material;
 (c) solidifying said matrix material by cooling thereof below its freezing point, and thereby bonding said matrix material to said ferrous screen and to said carbide particles to form said carbide-containing surface;
 (d) attaching said matrix material to a ferrous tool; and
 (e) quenching said matrix material and ferrous tool from a temperature in the austenitizing temperature range of said ferrous tool so as to harden said tool without thereby forming cracks in said matrix material.

* * * * *

UNITED STATES PATENT AND TRADEMARK OFFICE
CERTIFICATE OF CORRECTION

PATENT NO. : 4,933,240

DATED : June 12, 1990

INVENTOR(S) : William R. Barber, Jr.

It is certified that error appears in the above-identified patent and that said Letters Patent is hereby corrected as shown below:

Col. 2, line 23   Insert a period (.) after "required";

Col. 3, line 40   Change "abovedescribed" to --above-described--;

Col. 4, line 26   Change "ar" to --are--;

Col. 11, line 13  Insert a period (.) after "end".

Signed and Sealed this

Second Day of July, 1991

Attest:

HARRY F. MANBECK, JR.

Attesting Officer

Commissioner of Patents and Trademarks